United States Patent [19]

Forkner

[11] 4,409,249
[45] Oct. 11, 1983

[54] EGG PRODUCT AND PROCESS OF MANUFACTURE

[76] Inventor: John H. Forkner, 2116 Mayfair Dr. West, Fresno, Calif. 93703

[21] Appl. No.: 357,821

[22] Filed: Mar. 12, 1982

Related U.S. Application Data

[63] Continuation of Ser. No. 183,252, Sep. 2, 1980, abandoned, which is a continuation-in-part of Ser. No. 59,684, Jul. 23, 1979, abandoned, and a continuation-in-part of Ser. No. 83,116, Oct. 9, 1979, abandoned.

[51] Int. Cl.³ .......................... A23B 5/04; A23L 1/32
[52] U.S. Cl. .................................... 426/100; 426/272; 426/275; 426/388; 426/519; 426/520; 426/568; 426/614
[58] Field of Search .............. 426/100, 272, 274, 614, 426/385, 388, 444, 456, 519, 521, 524, 273, 302, 520, 565, 568, 457, 464, 470, 473, 275

[56] References Cited

U.S. PATENT DOCUMENTS

| | | |
|---|---|---|
| 2,421,199 | 5/1947 | Gutmann . |
| 2,458,449 | 1/1949 | Urbain et al. .................... 426/614 X |
| 2,756,155 | 7/1956 | Hale et al. . |
| 2,766,126 | 10/1956 | Hawk . |
| 2,858,224 | 10/1958 | Darrah . |
| 2,936,240 | 5/1960 | Kauffman et al. . |
| 3,385,712 | 5/1968 | Dodge et al. . |
| 3,408,207 | 10/1968 | Katz . |
| 3,475,180 | 10/1969 | Jones . |
| 3,510,315 | 5/1970 | Hawley ........................... 426/614 X |
| 3,556,813 | 1/1971 | Creswick . |
| 3,573,935 | 4/1971 | Sourby et al. ....................... 426/614 |
| 3,737,330 | 6/1973 | Kohl ................ 426/614 X |
| 3,857,974 | 12/1974 | Aref et al. .......................... 426/148 |
| 3,863,018 | 1/1975 | Shires ................................ 426/388 |
| 3,941,892 | 3/1976 | Glasser ............................... 426/104 |
| 4,103,040 | 7/1978 | Fioriti et al. ........................ 426/614 |

*Primary Examiner*—Arthur L. Corbin
*Attorney, Agent, or Firm*—Flehr, Hohbach, Test, Albritton & Herbert

[57] ABSTRACT

High energy agitation is applied to coagulated and uncoagulated egg white portions to form a homogeneous, aerated egg white dispersion. The egg white dispersion is then assembled with processed egg yolk and the assembly is frozen.

45 Claims, 14 Drawing Figures

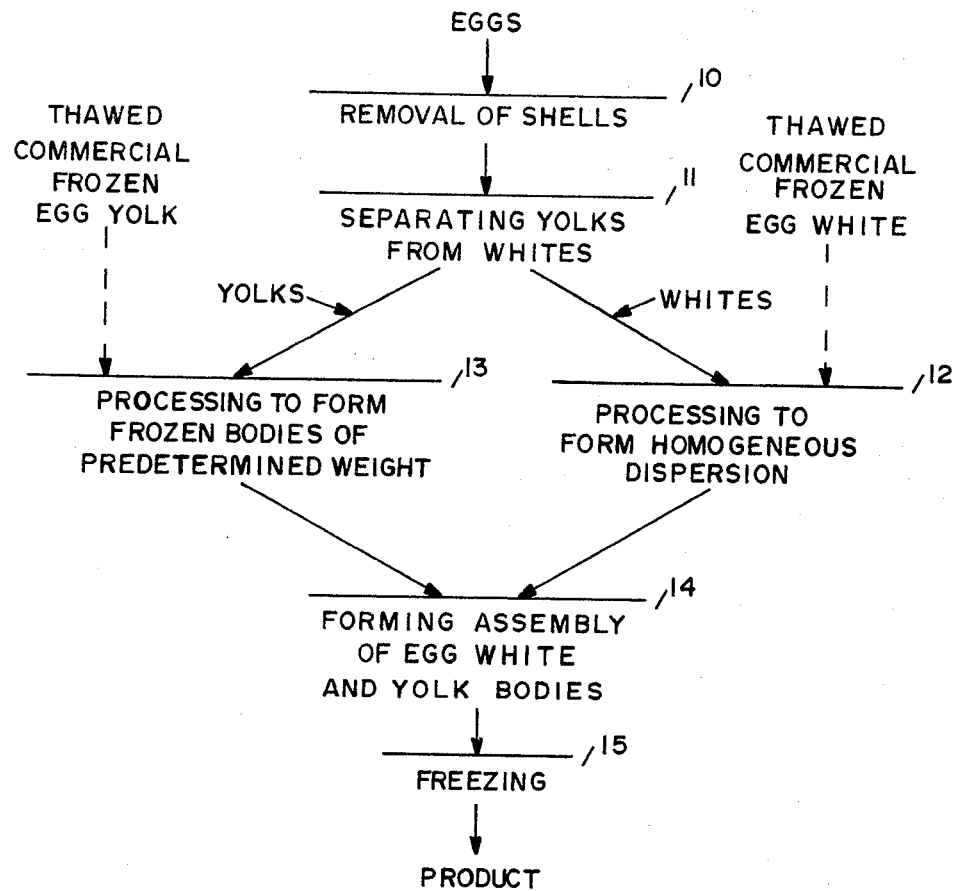
FIG.—1
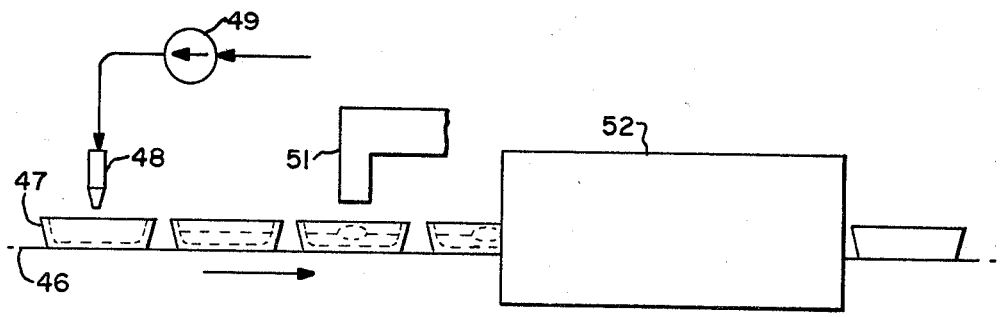
FIG.—4

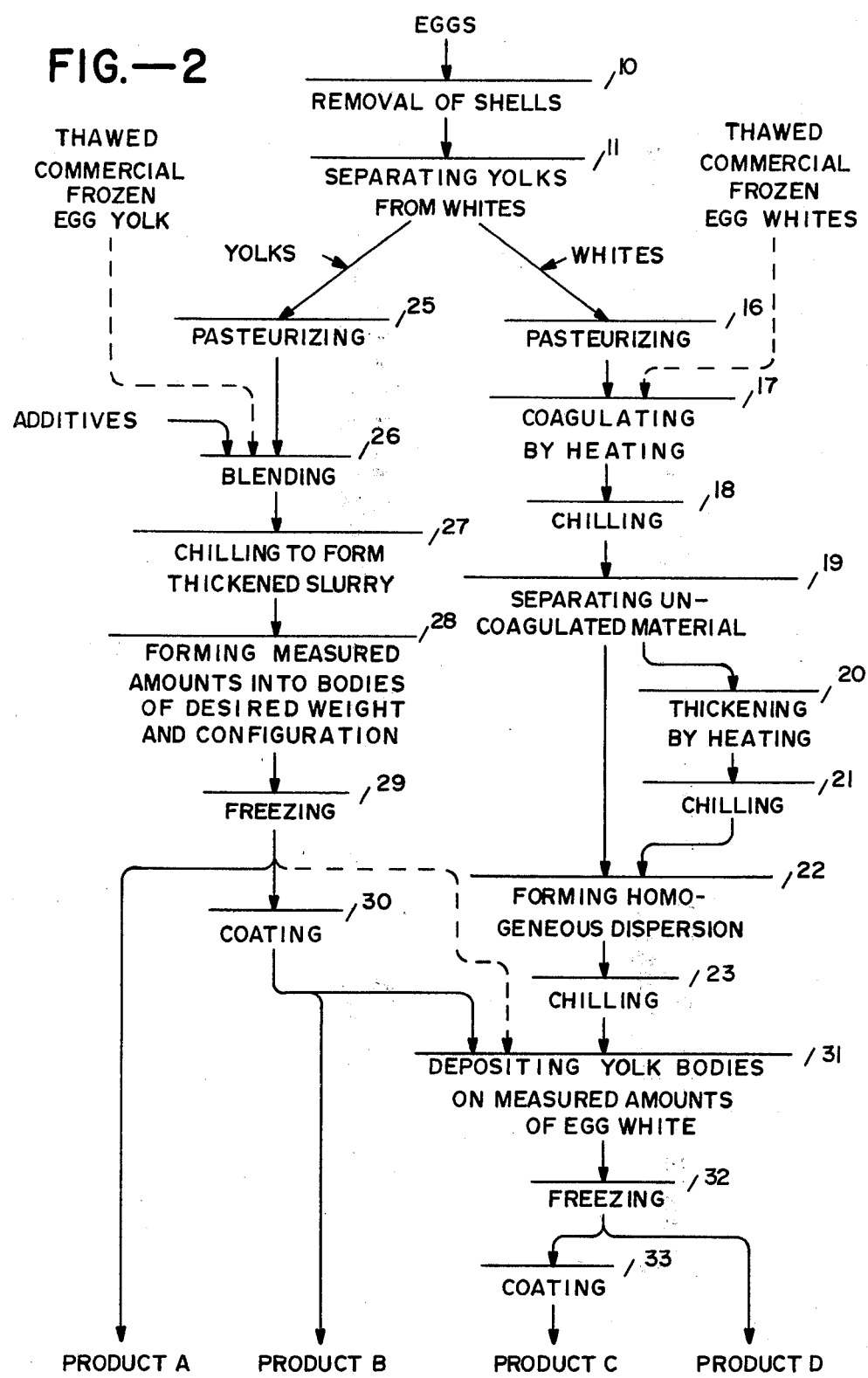

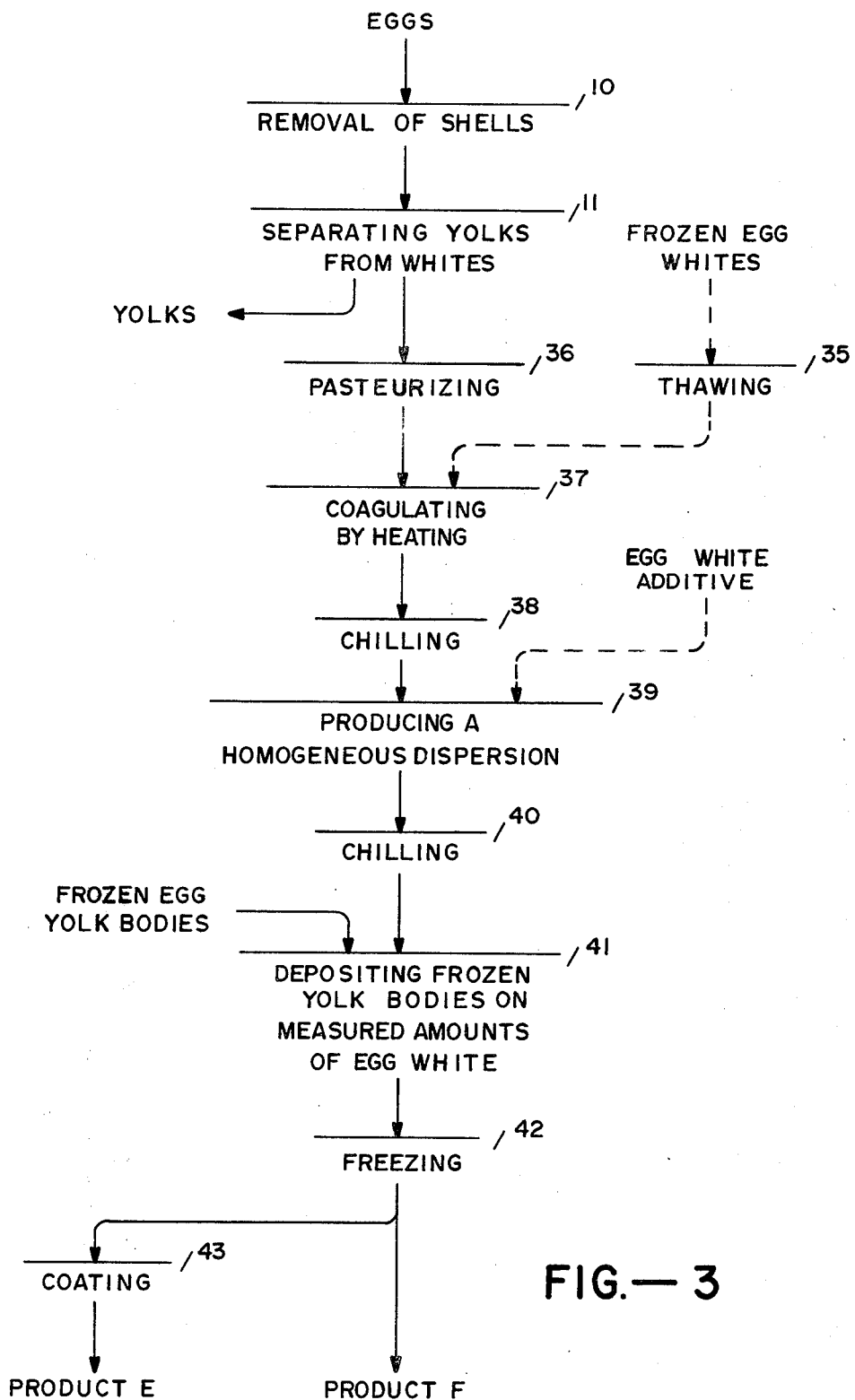
FIG.—3

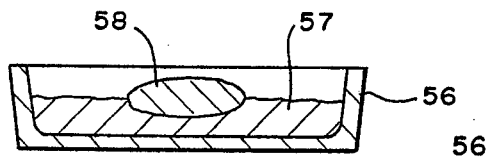
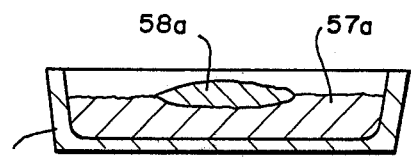
FIG.—5     FIG.—6
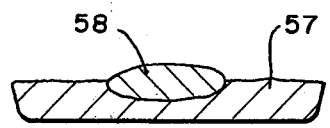
FIG.—7
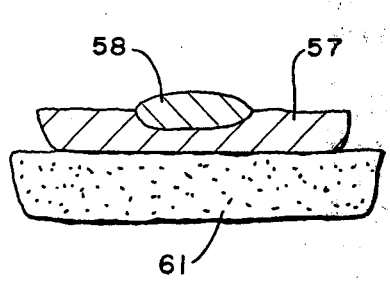
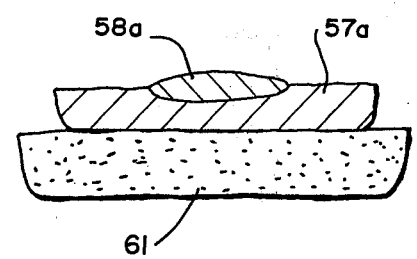
FIG.—8     FIG.—9
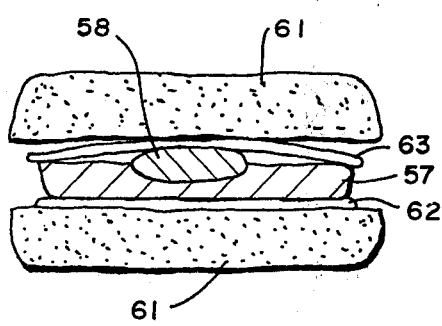
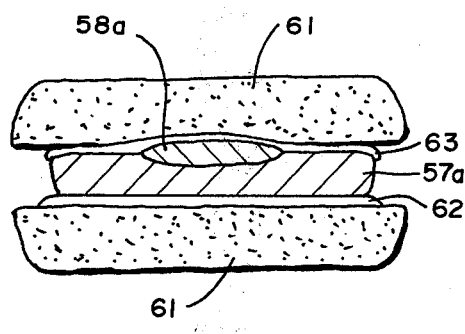
FIG.—10     FIG.—11

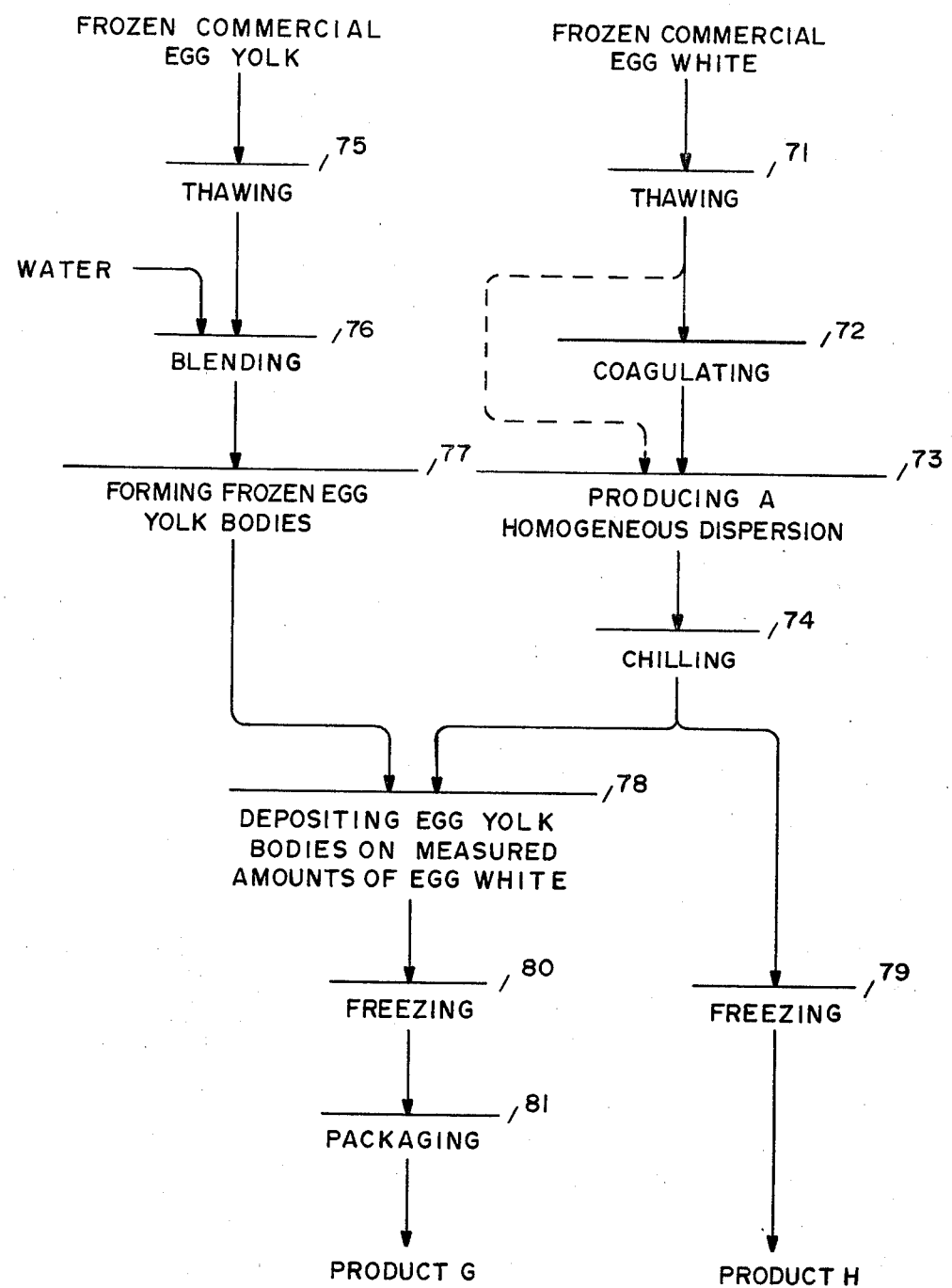
FIG.—12

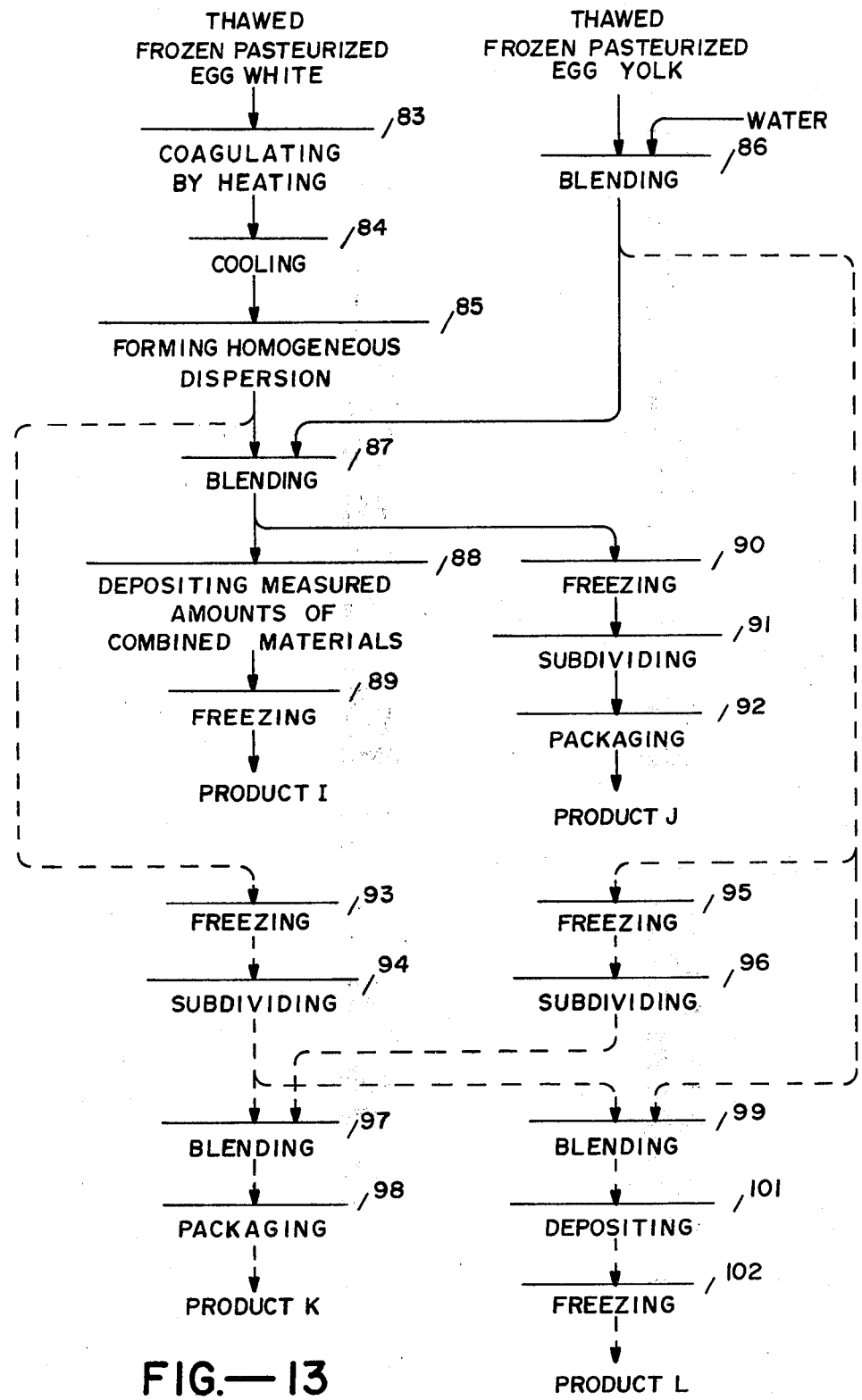
FIG.—13

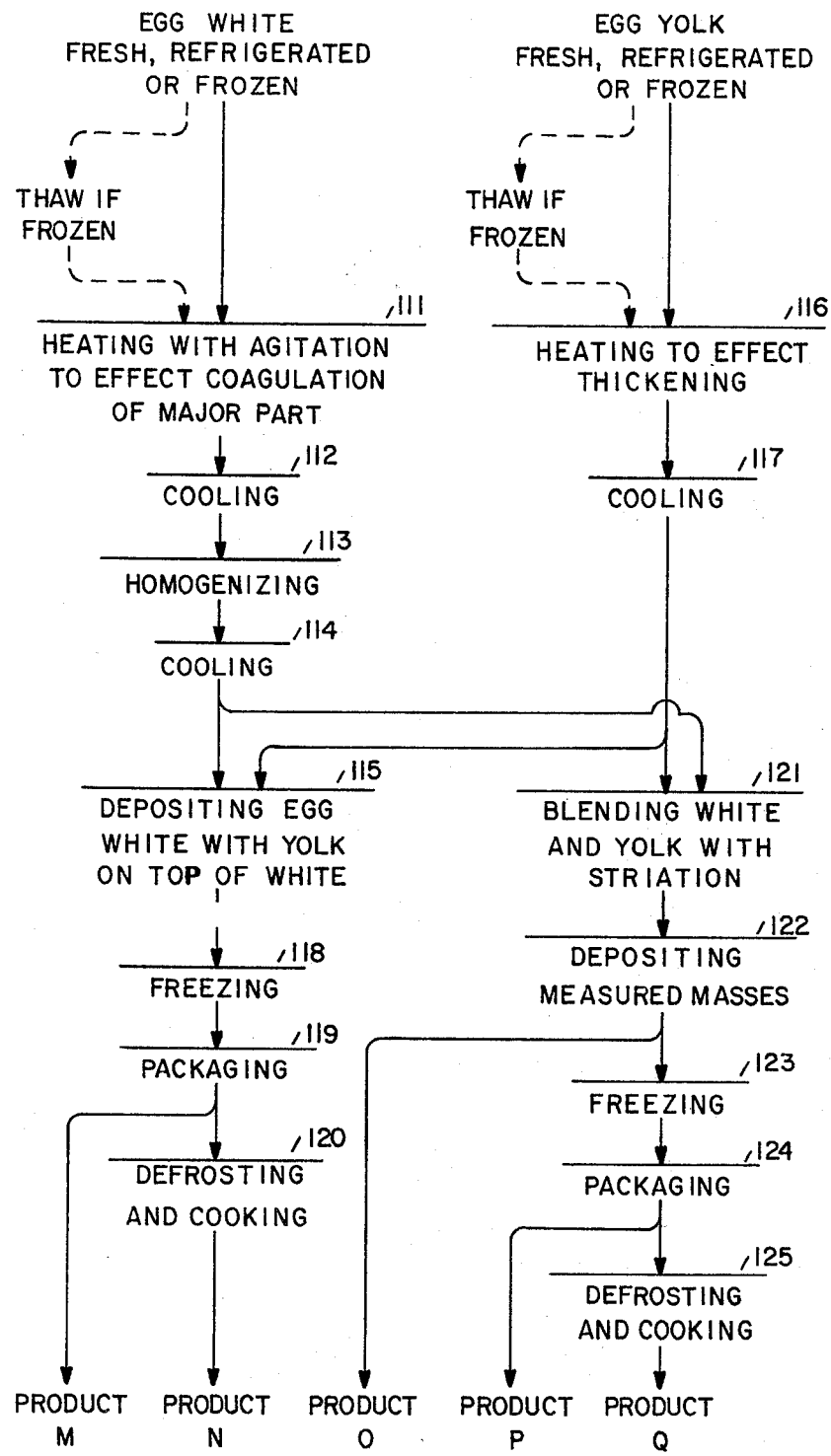
FIG.—14

EGG PRODUCT AND PROCESS OF MANUFACTURE

This application is a continuation of my application Ser. No. 183,252 filed Sept. 2, 1980, now abandoned, which in turn is a continuation-in-part of application Ser. No. 059,684 filed July 23, 1979, now abandoned, and a continuation-in-part of Ser. No. 083,116 filed Oct. 9, 1979, now abandoned.

This invention relates generally to food products containing or consisting of egg material and to processes for their manufacture. More particularly, it relates to marketable frozen egg products and processes which are applicable to the restaurant, institutional, grocery or domestic consumer trades.

A number of processes exist for the manufacture of preserved egg material. For example, egg whites have been dried by various methods, including spray drying, vacuum drying, foam drying and the like, to produce dry granular or powdered products which can be reconstituted with water. Such products are used primarily as an ingredient of formulated food products. Pasteurized raw egg whites have also been frozen in metal containers and stored pending further commercial processing. Egg yolks have likewise been processed for producing products which can be stored in frozen condition for extended periods without spoilage and thereafter used in formulated products such as mayonnaise. For consumer or processed food uses, there is a particular demand for a frozen egg product having white and yolk portions and which can be quickly prepared for eating. Also there is a need for a frozen egg product that can be warmed or cooked after being incorporated in an open or closed refrigerated or frozen sandwich, with or without being in contact with other food materials commonly used in sandwiches.

When fresh egg white is coagulated by heating and then frozen, the resulting frozen product has certin characteristics which make it undesirable. Particularly, when thawed and cooked by conventional methods, such as on a grill, oven baking or microwave oven, the white portion is tough and lacking in palatability. Also when cooked in an oven of the microwave type, both white and yolk portions are subject to explosive effects which with respect to the egg white may be due to moisture trapped in certain albumenous portions, such as the chalaza, which are spiral bands of thickened albumenous substances extending from the yolk to the shell lining membrane. With respect to the egg yolk, such effects may be in part due to the natural enveloping membrane which separates the yolk from the white. Pasteurized egg yolk is to some extent subject to the same undesirable effects. Another characteristic of raw, frozen or pasteurized eggs is that when deposited on a bun and heated in a microwave oven, the egg materials spread and flow over the edges of the bun, or penetrate the underlying dough and thereby cause sogginess, or both.

As distinguished from freezing a whole raw egg with the yolk intact, it has been proposed to prepare batches of separated egg white and yolk material and successively deposit measured amounts of the separated material into trays followed by freezing. In other words, an amount of egg white corresponding to that in a conventional egg is deposited first and then a measured amount of the yolk material deposited on top of the white. Here again such products when thawed and cooked by conventional methods tend to be tough and lacking in palatability and flavor comparable to cooked fresh eggs.

In general, it is an object of the present invention to provide frozen egg products that can be marketed to the restaurant, institutional, grocery or consumer trades and which, when subjected to thawing and controlled heating, provide end products that compare favorably to cooked natural fresh eggs, having reference to palatability, tenderness, appearance, texture and flavor.

Another object of the invention is to provide an egg product having its white portion in the form of a flowable homogeneous dispersion before freezing, and which, during the course of freezing and thawing, undergoes gellation with loss of flowability.

Another object is to provide a frozen egg product which can be thawed and heated preparatory to eating without resulting in toughness, undesirable exudation of white material, and without microwave explosive effects.

Another object is to provide a sandwich-type product containing a frozen egg, which can be thawed and heated in a microwave oven with or without other food materials such as cheese and meats, and without having the egg white spread over the edges of the underlying dough layer.

Another object is to provide a frozen egg product which has at least some of the yolk material striated and interdistributed in the egg white, to provide an omelet or scrambled egg.

Another object is to provide a process especially adapted for producing the subject product.

Another object is to provide a process for producing a frozen egg product which converts egg white to a homogeneous material that is flowable, and which after freezing and thawing, the egg white is in the form of a thickened gel with loss of the flowability that characterized the processed egg white before freezing.

Another object is to provide a process for the manufacture of the product, the process being such that it lends itself to automation by the use of automated equipment.

Another object is to provide a process which produces a frozen egg product in such condition that when thawed and heated it has the tenderness, texture and eating properties of natural cooked eggs.

In general, the process of the present invention makes use of egg white and yolk materials which are separately processed and then combined to form a frozen egg product assembly. The processing of the egg white material includes heat treatment to effect a controlled degree of coagulation, after which the coagulated material together with some uncoagulated egg white is homogenized as by subjecting it to high energy agitation with high shear forces. This produces a flowable homogeneous dispersion. A predetermined amount of such processed egg white material is combined with yolk material, and the assembly is then frozen. During the course of freezing and subsequent thawing, changes occur with respect to the egg white whereby it is no longer flowable and has a gel-like structure. Frozen egg products produced by the process are characterized by processed egg yolk material retained by the processed egg white to form a unitary assembly. When thawed and heated, the white portion is tender and palatable, being comparable to a cooked natural egg.

Additional objects and features of the invention will appear from the following description in which the preferred embodiments have been set forth in detail in conjunction with the accompanying drawing.

REFERRING TO THE DRAWINGS

FIG. 1 is a flow diagram illustrating the general procedures for carrying out the process.

FIG. 2 is a flow diagram which more completely illustrates the various steps of the process.

FIG. 3 is a flow diagram illustrating another embodiment of the process.

FIG. 4 is a schematic view illustrating carrying out formation of the composite egg product in an automated fashion.

FIG. 5 is a side elevational view in section showing a product assembly before cooking.

FIG. 6 is a view like FIG. 5 but showing the product after cooking.

FIG. 7 is a side elevational view in section of another composite product which has been enveloped or encapsulated in a retaining membrane.

FIG. 8 illustrates the product of FIG. 7 on one half of a muffin preparatory to microwave cooking.

FIG. 9 is a side elevational view in section showing the assembly of FIG. 8 after microwave cooking.

FIG. 10 shows an egg product incorporated in a sandwich.

FIG. 11 shows the sandwich of FIG. 10 after cooking in a microwave oven.

FIGS. 12, 13 and 14 are flow diagrams showing further embodiments of the invention.

The general procedure illustrated in FIG. 1 is as follows: Fresh eggs are removed from their shells in step 10, and in step 11 the yolks are separated from the whites by conventional methods. Thereafter the yolks and the whites are separately processed, after which they are recombined in the final composite product. Pasteurized commercial frozen egg yolk after thawing may be used in place of fresh egg yolk, as indicated by dotted lines, and likewise pasteurized commercial frozen egg white after thawing may be used in place of fresh raw egg white. The whites are shown being subjected to processing 12 and the yolks to processing 13. As will be presently explained, the processing involves certain operations, including pasteurizing in the event the source materials are not previously pasteurized. With respect to the yolk material, its viscosity may be modified by blending with an additive, such as diluting water. This applies particularly when pasteurized frozen commercial yolk material, which has a higher viscosity than fresh yolk, is used. Also when the product is to be cooked in a microwave oven, dilution of natural egg yolk tends to inhibit explosive effects. Processing of fresh egg yolk may merely involve agitation to disrupt and disperse the natural yolk membrane and pasteurizing. Various flavoring constituents (e.g., sugar and salt) may be blended in the yolk material. In some instances as will be presently explained, it is desirable to thicken the yolk as by heat treatment to effect some congealing or coagulation.

After processing of the yolk material, in one embodiment it is formed into bodies of predetermined weight having a configuration suitable for combining with the whites. Processing of the egg white comprises heat treatment to effect coagulation. The coagulated material, together with some uncoagulated egg white, is processed by high energy agitation with high shear forces to produce a homogeneous flowable dispersion having some overrun or aeration (e.g., 10 to 50% overrun). The presence of some uncoagulated egg white before forming the homogeneous dispersion may be carried out by controlling coagulation short of completion, or by the addition of some uncoagulated pasteurized egg white. The frozen bodies of yolk material are combined with measured amounts of processed egg white material in step 14. Such assemblies are then subjected to freezing 15 to produce a final product that may be stored in frozen condition for extended periods. When such assemblies are to be eaten, they are thawed and generally heated to a desired temperature above ambient, with or without some further coagulation. As subsequently described in greater detail, during the course of freezing and thawing, the homogenized flowable egg white undergoes certain changes, namely there is a loss of flowability and a gel-like structure is imparted to the material.

A process of the character generally shown in FIG. 1 is illustrated in FIG. 2. In this instance the removal of eggs from their shells in step 10 and the separation of yolks from whites in step 11 is the same as in FIG. 1. Here again commerical frozen egg white and commercial frozen egg yolk materials can be used after thawing. The egg whites, if unpasteurized, may be subjected to pasteurizing 16 at temperatures short of causing coagulation, such as 133° F. to 140° F., with a holding time of the order of 3 to 6 minutes. Assuming use of fresh egg white, pasteurizing is generally accompanied by some agitation. In this particular embodiment, the egg white material is subjected to partial coagulation 17 as by heating the material to a temperature of the order of 140° F. to 180° F. for a period of time sufficient to coagulate from 60 to 90% of the material, but without causing complete cooking. This can be carried out by conventional methods, such as controlled heat exchangers capable of uniform heating, or exposure to saturated steam at atmospheric pressure. Such an operation can be controlled whereby all of the egg white (e.g., 10 to 50%) is not coagulated. The coagulated material is relatively white and in the form of a soft gel which by virtue of natural texturizing is somewhat cohesive. This assumes that the time and temperature factors are controlled to avoid complete coagulation of the white materials as in a typical hard boiled egg.

In the procedure of FIG. 2, some uncoagulated egg white material, which is a relatively clear fluid, is shown being separated from the coagulated egg white by first chilling the material in step 18 to a temperature of the order of 30° F. to 40° F. immediately following coagulation. This serves to arrest further coagulation. Then some uncoagulated material is removed in step 19 as by depositing the mass upon a supporting surface or screen, warming (e.g., to 40° F. to 65° F.), and permitting some uncoagulated liquid egg white fraction to drain from the mass. In such a separating operation some of the uncoagulated material remains with the coagulated mass. The removed uncoagulated material can be processed by subjecting it to further heat treatment in step 20 as by heating to a temperature of the order of 150° F. to 180° F. for a period of time sufficient to effect substantial thickening without complete cooking or coagulation, after which the material is subjected to chilling in step 21 (e.g. to 35° F. to 60° F.). Although the material leaving step 20 is thickened by the heat treatment, it tends to be relatively clear with a yellow-greenish tinge. In other words, it does not have the white appearance of the material from which it is separated in step 19. The thickened material from step 21 may then be combined with the main mass of coagulated material from step 19, in the blending and homogenizing step 22. Homogenizing is carried with high energy agitation and high shear forces to produce a homogeneous dispersion that is cream-like in appearance. Good results can be obtained by use of equipment of the Waring Blender-type. Also it is considered that homogenizing equipment such as is used in the dairy industry can be used. Similar treatment can be applied to the uncoagulated material before it is added in step 22, whereby it is converted into a fluid aerated creamy material. The temperature of the material in step 22 before and during such treatment should be below that which would cause substantial further coagulation (e.g., below 140° F.). Assuming use of equipment of the Waring Blender-type, the temperature of the material immediately before being homogenized can, for example, be of the order of 28° F. to 40° F. and 45° F. to 60° F. immediately thereafter. The homogeneous egg white dispersion produced by such processing is a cream-like mass with a substantial amount of overrun (e.g., 10 to 50%). It is not textured and has little or no cohesiveness. The major part of the egg white is coagulated, and a minor part is uncoagulated but homogenously combined with the coagulated part. The dispersion from step 22 may then be subjected to chilling 23 which may reduce the temperature to at or about 28° F. to 40° F., thereby forming a thickening slurry that may be in semifrozen condition.

Egg white processed as described above is fluid or flowable as distinguished from the texturized state of raw egg white, and it has little or no gellation. Its viscosity depends upon its temperature. At temperatures of the order of 28° F. to 40° F. it can be deposited on a chilled surface with the spread being limited by its viscosity. Thus the deposited masses can be controlled as to form, dimensions and weight.

The processing of yolks preferably involves pasteurizing 25, in the event that pasteurizing is not carried out in preceding operations. Assuming that the yolk material consists of thawed commercial egg yolk, it tends to be relatively dense or viscous compared with typical fresh egg yolk. In step 26 such material may be blended with an aqueous diluent, particularly water, to form a homogeneous mix that may contain 15 to 45% added water (25% optimum). Additional additives can be incorporated in the yolk material such as coloring, salt, sugar, water or special flavoring and small amounts of an emulsifier (e.g., 0.1%) like lecithin. As will be presently explained, in some embodiments the egg yolk material is not diluted, but is subjected to controlled heating to produce a desired amount of congealing and thickening. In step 27 the processed yolk material is chilled to a temperature at or near freezing point to form a semifrozen slurry. In steps 28 and 29 the yolk slurry is formed into frozen bodies of desired weight and configuration. These bodies are indicated as forming Product A, and after coating in step 30 with a translucent edible hydrophilic material they form Product B. Coating may be carried out by spraying on any one of several edible materials, such as alginates, albumen or waxes, together with a panning operation. In step 31 one or more bodies of the frozen yolk material are deposited upon measured amounts of the egg white slurry. Instead of depositing preformed bodies, a measured amount of the chilled yolk slurry can be directly deposited on the egg white material. These composite assemblies are then subjected to freezing 32 to form marketable Product D. Such products may also be coated with an edible hydrophilic coating material in step 33 to form the Product C. Generally the frozen yolk forms are sized to be comparable to natural yolks. However, smaller sized or miniature forms can be made and a plurality of such forms used in one assembly.

During the processing of the egg white material as illustrated in FIG. 2, the agitation and shear forces applied in processing serve to destroy the natural texture and cohesiveness, although a gel-structure is imparted during the course of freezing and thawing. Also the processing conditions the egg white material whereby, upon heating in a microwave oven, no undesirable explosive effects are experienced. In the embodiments of FIG. 2 coagulation of the egg white in step 17 is carried out at relatively low temperatures (e.g., 180° F.). However, as subsequently explained, higher coagulating temperatures can be used. When coagulation is carried out in heat exchange equipment having heated surfaces (e.g., at 180° F. to 212° F.) in contact with the egg white material, with means for continually scraping off material from the heated surfaces, films of coagulated white are continually removed from the heated surfaces and commingled with the body of the material. While the films being removed may initially be at temperatures of the order of 180° F., the body of the material at the end of the operation may be at temperature of about 140° F.

The depositing step 31 of FIG. 2 can be carried out in different ways. When the processed egg white material is chilled (e.g., in the form of a semifrozen slurry), a measured amount corresponding to the white of a natural egg can be deposited in either a molding tray or on a flat surface. When deposited on a flat chilled surface, spreading is limited with a rounded perimeter, and the thickness of the deposit is relatively uniform (e.g., of the order of ¼ to ⅜ inch). The subsequently deposited yolk material may be frozen solid or a semifrozen slurry. Molding trays produce assemblies that are more precise as to dimensions and form and the white material may be the processed material from step 22 without further chilling.

With respect to the edible material which may be used for the coating operations 30 and 33, preferably it should provide an edible pliable membrane which is extensible, and preferably substantially transparent or translucent and relatively indiscernible. In other words, in general appearance and physical form it should simulate the enclosing membrane of egg yolks in natural uncooked eggs. However, it should not be so impervious or have such strength as to entrap water vapor during microwave cooking, with resulting explosive effects. For such a gel-type coating material, good results have been obtained by utilizing a solution of alginate (e.g., Keltone) or low methoxyl pectin which can be set by contact with a divalent metal salt (e.g., calcium chloride solution). The coating material in step 21 is first applied to the surface of the frozen body as by dipping or spraying, after which the body is contacted with a setting solution as by dipping or spraying. The result of this treatment is to provide the yolk with an edible pliable transparent and extensible membrane which is capable of retaining the yolk during thawing and cooking. As previously explained, in some instances uncoagulated and pasteurized egg white material can be used to surface the frozen yolk bodies and the final frozen assemblies. Also when Product B consists of smaller sizes or fragments the coatings may be uncoagulated egg white which is coagulated when heated in the course of subsequent use. Various edible fats can also be used as coating materials.

The frozen yolk bodies forming Products A and B can be marketed in frozen condition and used for a variety of purposes. For example, they can be warmed or cooked in any of the conventional baking ovens or by microwave oven. When made in smaller sizes and coated as Product B, for example, one-quarter to three-quarter inch in diameter, they can be dispersed in desserts, doughs, hash, potatoes of the hash-brown type, batters or frozen food products. The membrane becomes pliable and extensive upon thawing and serves to retain the yolk in a manner comparable to natural egg membrane. Coating with similar material in step 33 applied to the entire composite product tends to protect the composite product in marketing packages and after thawing. In addition, to some extent it may serve while being thawed and cooked, or when present in contact with other moist food materials, to confine the lateral spread or dispersal of the product into adjacent food material.

Particularly when commercial pasteurized egg yolk material is used, the materials added to the yolk material may include thickening agents such as gum arabic, agar, locust bean gum, Xanthan, Carrageenin, gelatin, pectin, alginates and gelatinized starch. Also coloring and flavoring can be added, and small amounts of an emulsifying agent such as lecithin. The thickening agents just mentioned may be used in such amounts as to provide a desired viscosity without causing flavor impairment.

In the embodiment of the process illustrated in FIG. 2, some uncoagulated egg white material removed from the precoagulated mass or from a separate source is shown being separately heat treated and then added and blended with the main mass of egg white material to form a homogeneous dispersion. In the embodiment illustrated in FIG. 3 the main mass of coagulated material, together with the minor part of the material which is not coagulated, is processed to produce a homogeneous dispersion as previously described. Steps 10 and 11 of FIG. 3 are the same as steps 10 and 11 of FIG. 2. Following pasteurizing 36 of the whites and coagulating 37, the material, including both coagulated and some uncoagulated egg white (e.g., from 10 to 30% of the processed material), is chilled in step 38 and subjected to high energy agitation with high shear forces as previously described to produce a flowable homogeneous dispersion. Thereafter, the homogeneous dispersion is preferably subjected to chilling 40 (e.g., 30° F. to 60° F.; 35° F. to 40° F. preferred) to form a thickened slurry, after which in step 41 a measured amount of the material is deposited and combined with one or more separate and intact frozen egg yolk bodies. Generally one egg yolk body is used for each measured amount of egg white material, although as previously mentioned, in some instances two or more smaller egg yolk bodies may be combined with one egg white body. The composite egg products thus formed are subjected to freezing to produce Product F. These composite assemblies may be coated in step 43 to form Product E, using coating materials as previously described.

However, as previously indicated, instead of fresh eggs as source material it is possible to make use of commercial frozen or refrigerated egg white which is available in containers, and also relatively homogeneous frozen egg yolk material. In the event such materials are employed, they can be processed the same as egg whites and the yolks of fresh eggs. Care should be taken to ensure that such commercial products are pasteurized, or if not pasteurized, pasteurization should take place in conjunction with processing. In FIG. 3 an optional source of egg white material is illustrated as being frozen egg whites, and this material is shown being subjected to thawing 35 before being coagulated in step 37.

In the embodiment of FIG. 2, the separated egg white fraction is thickened by heat treatment and blended with the main precoagulated white portion. In some instances the separated fraction may be removed from the process and used for other purposes, with a sufficient amount (e.g., 10 to 15%) being left with the coagulated fraction for processing. If removal is relatively complete, a separate source of fluid egg white may be blended with the main portion, preferably after it has been pasteurized and partially coagulated. Also some or all of such removed egg white may be used to coat the final frozen product.

FIG. 4 schematically illustrates how certain steps of the invention can be carried out in an automated fashion. A conveyer 46 carries molds 47 beneath a filling nozzle 48, which receives measured amounts of processed egg white dispersion from the metering pump 49. It is assumed that this material has been processed as previously described. The molds, each with a measured amount of egg white slurry, then proceed below the depositing device 51 which deposits a frozen or semifrozen egg yolk body upon the egg white in each mold. In some instances the conveyer may move the molds through the tunnel-type microwave oven 52 which heats the assemblies for immediate consumption. In place of an oven of the microwave type, other types of cooking equipment can be used such as cooking steamers which subject the material to cooking by contact with saturated steam at atmospheric pressure, hot air ovens or heating lamps. Generally, however, 52 is a freezing section which freezes the assemblies for storage and marketing. Freezing not only serves to preserve the product during storage at freezing temperature, but in addition causes such changes in the cream-like egg white disperson that when the product is thawed, it no longer is a flowable cream-like dispersion, but is a gel with properties, including texture, flavor and palatability, which provides the appearance and eating properties of fresh cooked eggs. In place of molds 47, the chilled egg white dispersion may be deposited on a chilled conveyor surface. Also the chilled dispersion may be deposited in various forms, such as extended strips upon which processed egg yolk in various forms may be deposited.

In the foregoing, it is assumed that the egg yolk bodies are made of natural egg material. For dietetic purposes it may be desirable to make use of synthetic egg yolk formulated, for example, from vegetable fat, high protein modified whey solids, gums and stabilizes, emulsifiers, coloring and flavoring. Such formulated dietetic material can be made into bodies that are frozen and coated in the same manner as previously described for natural egg yolk material.

Coating of the yolk bodies to provide an edible elastic membrane serves to retain the separate identity and configuration of the yolk during thawing and cooking preparatory to eating, particularly when the yolk has been diluted by addition of water or other aqueous material. While application of the coating may be desired, some migration of an unrestrained yolk may be desired in some instances, for example in making the omlet or scrambled egg forms hereinafter described.

FIGS. 5-9 illustrate products produced by the foregoing process. FIGS. 5 and 6 show a molding tray 56 which may be round or otherwise shaped as viewed in plan. The frozen assembly which has been produced within the tray consists of the white portion 57 and the yolk portion 58. The yolk portion may have an edible membrane coating as previously described. FIG. 6 represents the assembly of FIG. 5 after cooking in a microwave oven. The cooked white portion 57a has a more irregular surface compared to the surface of the portion of FIG. 5. The yolk portion 58a is somewhat flattened, but due to the confining action of the surrounding membrane it has retained the appearance of a natural egg after the egg has been cooked. Use of a molding tray also makes possible immersion of the yolk body within the egg white, as for example, by first depositing a layer of egg white, then the yolk, and finally an upper layer of egg white. Such an assembly when thawed and cooked simulates "eggs over easy".

FIG. 7 shows the frozen product after having been removed from its molding tray. Such an assembly may or may not be completely enclosed within a thin membrane coating comparable to that applied to the frozen yolk. Such a product, can be marketed as a frozen item with a number of such products in one package.

A product such as shown in FIG. 7 has certain inherent characteristics which make it applicable for cooking, including cooking in ovens of the microwave type. Assuming that the product rests upon a flat surface and is subjected to successive thawing and cooking cycles, the egg white material when thawed does not exude clear liquid to an objectionable extent, but remains substantially intact. The same applies during the initial phases of the cooking cycle. This is attributed to the manner in which the egg white is processed, and also to the physical change in the structure of the egg white during freezing and subsequent thawing after storage. The change involves converting the homogenized dispersion, which has little if any gel-like properties, to a gel structure which is not subject to any substantial exudation of liquid when at refrigeration temperatures.

Although heating before being eaten generally involves some further coagulation of the egg white, this is not essential. When thawed and warmed to a suitable eating temperature, the product has flavor, palatability and tenderness comparable to a soft-cooked fresh egg. In some instances the product may be thawed and eaten cold. For example, the thawed product can be chopped and used in salads.

Assuming that time and temperature factors are properly controlled during the cooking cycle, the cooked egg has good eating properties. Particularly, it does not have an off flavor and the white portion is soft and tender. In general, the cooked product has properties such as palatability, tenderness, appearance, texture, flavor, and mouth feel comparable to a natural cooked egg.

The characteristics described above enhance the value of such products for domestic, institutional and restaurant use. Particularly, the frozen egg product can be placed upon one half of a bun 61 in the manner shown in FIGS. 8 and 9, with or without additional edible material such as slices of cheese or meat 62 and 63 as shown in FIG. 10. Also as shown in FIG. 10 the other half of the bun may be deposited on top of the assembly. Such an assembly can be stored in a freezer for extended periods before being used. Also they may be stored for shorter periods in a refrigertor, during which the egg product is thawed without any substantial exudation of liquid. During the thawing, whether before or after placing in a microwave oven, and also during the initial phase of cooking, no egg white liquid is exuded from the egg white mass to an unacceptable or undesirable extent because of the nature of the egg white processing previously described. As a result, the underlying part of the bun in contact with the egg white material does not become saturated with such uncoagulated material, and thus no objectionable sogginess is produced such as would be the case in the event such uncoagulated liquid should saturate a portion of the underlying dough. In addition, the gel-like structure of the egg white dispersion which is imparted to the material during freezing and subsequent thawing prevents any substantial amount of migration during heating or cooking. Thus the periphery of the egg white mass during cooking does not tend to spill over the edges of the bun and down the sides to the underlying supporting surface to produce an unsightly appearance. Also, such processing makes feasible a reduced cooking time in a microwave oven (e.g., 15 seconds to 2 minutes) which minimizes heating of added materials (e.g., cheese, etc.). FIG. 10 illustrates such an assembly before cooking in a microwave oven.

FIG. 11 shows the assembly of FIG. 10 after such cooking. The cooking cycle in this instance has caused a desirable amount of heating of the added food materials, and with some melting of the cheese. It will be evident that use of the product in this manner greatly enhances its value in restaurants, institutions (e.g., hospitals), or for consumer use. Short-time cooking in a microwave oven with the egg product disposed sandwich fashion between the halves of the buns or slices of bread, with or without other ingredients, simplifies the work of food preparation and serving.

With respect to cooking together with other food materials, bits of other foods, such as cooked ham, bacon, sausage or cheese, may be added in the depositing step (e.g., step 31 of FIG. 2) and thereby incorporated with the egg white before freezing the assembly. For example, food slices may be disposed below and on the upper surface of the egg material, separating contact between the bun dough and the egg.

While the product is adapted for final cooking or heating in a microwave oven, it can be cooked in other conventional ways, such as steaming, frying, poaching, exposure to infrared heat lamp, or in a hot air oven. Also while coagulation during processing of the egg white may be carried out by microwave heating, other conventional procedures can be used, provided the heat distribution, heating temperature and duration of heating is such that the mass of egg white material is heated to effect the desired degree of coagulation.

With respect to processing the egg white before homogenizing, it is preferable to carry out coagulation at a relatively low coagulating temperature to ensure the presence of some liquid albumen that is not coagulated. In this connection it is desirable to use equipment of the type hereinafter described in which films of coagulated white material are continually removed from heated surfaces and mixed with the main body of material.

FIG. 12 shows another embodiment of the invention which in some respects is simpler than the embodiments of FIGS. 1, 2 and 3. In this instance commercial pasteurized frozen egg yolk and egg white materials are used.

The frozen egg white is thawed in step 71 and subjected to partial coagulation in step 72 in the manner previously described. This material is then processed in step 73 to produce a homogeneous dispersion by high energy agitation with high shear forces, as by use of equipment of the Waring Blender type. Thereafter it is desirable to chill the dispersion in step 74 as previously described to thicken the same.

The commercial egg yolk material is thawed at 75 and blended in step 76 with water in the manner previously described. Thereafter in step 77 it is frozen in the form of yolk bodies of predetermined size corresponding generally to natural egg yolks. In step 78 the frozen egg yolk bodies are deposited upon measured amounts of the processed egg white dispersion. Thereafter the assembly is frozen in step 80 and packaged at 81 to produce the final Product G. As previously described, the frozen egg yolk bodies may be coated after freezing and before being deposited upon the egg white. Also the finished assemblies from step 80 may be coated as previously described. Processed egg white from step 74 without egg yolk may be deposited in measured amounts and frozen in step 79 to produce Product H.

The process of FIG. 12 assumes that coagulation in step 72 is carried out short of complete coagulation, or in other words, so that the material is coagulated to 60 to 90%. In step 73 the uncoagulated portion of the egg white is reconstituted with the coagulated material by high energy agitation to produce a cream-like homogeneous dispersion.

It has been found that with the process of FIG. 12 it is possible to carry coagulation substantially to the point of complete cooking, whereby the egg white is cooked to a hardness comparable to a hard boiled egg. However, in such event, some uncoagulated albumen material, such as regular commercial thawed and pasteurized egg white material (e.g., from 10 to 35% of the complete dispersion) is added before homogenizing, as indicated in dotted lines. As previously mentioned, it has been found that the high energy agitation with high shear forces serves to incorporate the added uncoagulated material to the cooked egg white to produce in effect a stabilized smooth egg white dispersion which, when frozen and thereafter thawed, produces a white material which is relatively tender and palatable, and which, with or without heating or cooking, is comparable in eating properties to natural cooked eggs.

In the foregoing embodiments the yolk material is processed, and a measured amount deposited on or with the processed egg white before freezing the assembly. Thus the yolk is more or less localized as distinguished from being distributed in the egg white. When such distribution is desired, as for example to produce an assembly which, when thawed and cooked, will produce what is commonly known as an omelet or scrambled egg, any one of several procedures can be used to effect the desired distribution of the yolk material. The procedure shown in FIG. 13 consists of coagulating frozen commercial pasteurized egg white after it has been thawed by heating as previously described, followed by cooling 84 and forming it into a homogeneous dispersion in step 85 by the procedures previously described. In the event coagulation is substantially complete in step 85, then some egg white albumen which is not coagulated is homogenized with the coagulated white material in step 85.

Commercial frozen egg yolk may be processed as previously described. A measured amount of egg yolk is blended in step 87 with the homogeneous egg white dispersion. The extent to which the egg yolk is distributed in the egg white in step 87 determines the character of the final product. Assuming that both materials are in semifrozen condition, a moderate amount of distribution of the egg yolk produces a streaked patterned final product comparable to scrambled eggs. More extensive distribution can be used for omelets, although it has been noted that although the distribution may be such as to give the complete product a relatively uniform yellow or golden color, the egg white remains somewhat striated with the yellow and the striations can be observed on close inspection. Following blending at 87 to produce the desired distribution of egg yolk material, the material is deposited in measured amounts and subjected to freezing 89 to produce the Product I.

A product of the scrambled egg or omelet type can also be made by subjecting the blended material from step 87 to freezing 90, followed by fracturing and subdividing 91 to produce a granular or particulate material. Such granular or particulate material may be packaged at 92, with each individual package containing an amount of material corresponding to a natural egg. The package may for example be a bag or pouch made of flexible plastic film such as polyethylene hermetically sealed to prevent contamination. Such packages are suitable for storage and marketing as frozen egg material. The contents of such packages can be cooked in the various ways previously mentioned, including cooking in ovens of the microwave type. Also such frozen particles can be introduced into various other food products, such as salads, since they are edible and palatable without further cooking.

FIG. 13 indicates another embodiment in which processed egg white and processed yolk materials are frozen and subdivided before blending to produce products of the omelet or scrambled egg type. Thus the cream-like homogeneous dispersion of egg white material from step 85 can be subjected to freezing 93 and subdividing 94 to form a fractured granulated material. Processed egg yolk material from step 86 is shown being frozen at 95, followed by subdividing 96 to produce a particulate yolk material which is then blended in step 97 with the subdivided material from step 94. This mixture of particulate materials is then packaged at 98 to produce the Product K.

Another procedure illustrated in FIG. 13 distributes processed egg yolk material in liquid or semiliquid form with particulate frozen egg white material. Thus egg yolk from step 86 in liquid or semiliquid form is blended in step 99 with subdivided frozen material from step 94, at which time the egg yolk material is spread or coated upon the frozen-egg white particles. Measured amounts of this mixture are then deposited at 101 and frozen at 102 to produce the frozen Product L.

Fracturing of the frozen material to form particles or granules as described in connection with FIG. 13 requires a temperature sufficiently low to effect brittleness (e.g., 0° or lower). Good results are also obtained by slicing or shredding the material into pieces of suitable size by use of slicing, dicing or shredding equipment which employs blades for cutting the material to the desired size. When slicing is employed, the temperature of the material should be sufficiently low to effect solidity (e.g., 5° F. to 20° F.), but not low enough to brittlize. Referring to FIG. 13, freezing at 90 can be to a temperature above that which effects hardening, and subdividing 91 can be carried out by slicing to suitable sizes (e.g., elongated pieces about ½ inch long) by use of a mill provided with slicing blades. Likewise, steps 93, 94, 95 and 96 can be carried out in the same manner to produce slices of both egg white and yolk materials from the blending step 97. After blending the pieces, measured amounts may be placed in plastic film bags and stored in frozen condition. During cooking in any of the ways previously described, the pieces agglomerate together in the form of scrambled eggs. Instead of slicing all of the frozen materials, a part may be subdivided into smaller particles and mixed with the larger slices. The processing of the yolk material may include addition of some additional uncoagulated egg white (e.g., 10-25% of yolk) followed by homogenizing in equipment of the Waring Blender-type to protect against excessive hardening or development of toughness of the yolk during freezing, storing or cooking.

To summarize with respect to the described embodiments of the process, coagulation of the egg white material during its processing is preferably short of complete coagulation (assuming that a hard boiled egg cooked in boiling water at 212° F. for 6 to 10 minutes is substantially complete or 100% coagulation), whereby some uncoagulated egg white (e.g., 10 to 33%) is present and is incorporated with the coagulated portion with high energy agitation and shear forces to produce a creamlike homogeneous dispersion. Also the egg white may be coagulated as in a hard boiled egg and then blended with a minor percentage of uncoagulated egg white, as previously explained. The overrun produced by aeration during homogenizing may be of the order of 10 to 50%. Assuming that some free liquid portion is drained away from incompletely coagulated egg white, the coagulated portion may of itself be processed together with remaining unseparated uncoagulated liquid, by high energy agitation, or it may be recombined with added uncoagulated material and processed to form the homogeneous dispersion. When the egg white is substantially completely coagulated (i.e., as in a hard boiled egg) it is combined with added uncoagulated pasteurized egg white (e.g., 10 to 50% of the combined egg white material) to produce the desired homogeneous dispersion. Preferred practice is to process by coagulating the egg white to about 75 to 90%, and then converting the material to a homogeneous dispersion without removing any of the minor amount of uncoagulated material. The yolk material, when directly derived from fresh eggs, is processed by applying sufficient agitation to break up or disperse the yolk membrane. When it is desired to have the yolk in liquid form after cooking, it is processed by blending with one or more aqueous additives (e.g., 15 to 45% added water) and an emulsifier such as 0.1% lecithin. The yolk material may be frozen in the form of sized bodies which may be coated and such bodies are deposited on the egg white material, or the processed yolk material may be chilled to form a semifrozen slurry and deposited on the processed egg white in measured amounts. With respect to cooking complete frozen egg products in a microwave oven, it is advantageous to make up bun assemblies or sliced bread sandwiches with a frozen egg assembly, with or without other foods, such as sliced cheese and ham. These can then be frozen and stored in a freezer. When distributed to point of use or sale they may be transferred to a refrigerator for thawing and any further storage before being eaten cold or after heating as in a microwave oven. Thawing may also be carried out by ambient exposure. Aside from microwave cooking, other final cooking methods can be used, such as frying, oven baking, boiling in water, or exposure to saturated steam at atmospheric pressure while in a plastic film bag.

In general, products produced by the foregoing procedures, when subjected to thawing and controlled cooking, are characterized by optimum tenderness, inhibited moisture exudation, palatability and flavor, and gellation of whites comparable to fresh eggs cooked under comparable conditions. This is attributed largely to the manner in which the white and yolk portions are processed, including coagulation and the cream-like homogeneous dispersion comprising coagulated and uncoagulated egg white material. Also it is attributed in part to effecting a gel structure of the egg white during the course of freezing and thawing. While some additives can be used, the process makes practical the manufacture of frozen egg products without any additives.

According to the embodiment illustrated in FIG. 14, egg white material, which may either be fresh egg white, refrigerated, or frozen and thawed, is subjected to heat treatment in step 111, together with some agitation to produce an egg white material which is largely coagulated, but which contains some uncoagulated material. For example, from 10 to 33% (10 to 20% preferred) of the material may be uncoagulated. Depending upon the heat treatment employed, the temperature of the body of the material leaving step 111 may be of the order of 140° F. to 180° F. This material is cooled in step 112 to a temperature of the order of 35° F. to 45° F. (40° F. optimum). The cooled material is then subjected to homogenizing 115, carried out as previously described. The resulting creamlike and aerated homogeneous dispersion leaves homogenizing step 115 at a somewhat higher temperature as, for example, about 55° F. to 65° F. The dispersion is then cooled at 114 to a substantially lower temperature as, for example, to 28° F. to 40° F. At that temperature, the dispersion is viscous but flowable. In step 115 the viscous dispersion is deposited upon a supporting surface, either as an extended layer, in predetermined measured amounts each corresponding to a natural egg, or within a molding tray of suitable dimensions.

The source of egg yolk material may likewise be either fresh, refrigerated, or frozen. If frozen, it is first thawed before being subjected to further processing. As will be presently explained, it is desirable in this embodiment to thicken the egg yolk as by heat treatment in step 116. Such thickening may not be necessary when the yolk has been frozen and pasteurized. The temperature and time factors employed depend upon the degree of thickening desired. To obtain the desired thickening effect, the heat treatment must be at temperatures and over time periods sufficient to effect substantial but incomplete congealing or coagulation of the egg yolk material. It is desirable to carry out such heat treatment together with agitation, whereby the thickened yolk material is homogeneous. Also it is desirable to carry out thickening to such an extent that the material has a paste-like or plastic consistency and is substantially thicker or more viscous than the egg white material after cooling in step 114. Cooling in step 117, which may be to a temperature of the order of 60° F. to 80° F., serves to further thicken the yolk material. The thickened egg yolk material from step 117 is shown being combined with the deposited egg white in step 115. This can be carried out by first depositing measured amounts of the egg white dispersion in one of the manners previously described, and then depositing measured amounts of the egg yolk material upon the egg white. Some stirring may be applied to somewhat distribute the egg yolk material in the egg white. Such composite products are subjected to freezing in step 118, followed by packaging 119, to form Product M. The packaged frozen material can be subjected to defrosting and cooking 119 carried out in the manners previously described, to produce Product N.

Thickened egg yolk material from step 117 can likewise be supplied to step 121 where it is blended with homogenized egg white dispersion. Blending in this step is preferably carried out by a type of processing equipment provided with high speed rotating knives which have a slicing effect on the thickened egg yolk material. Since the partially coagulated egg yolk material has a consistency that is relatively harder than the egg white dispersion, the net effect is to subdivide the relatively thick egg yolk material into pieces or slices, which become dispersed throughout the body of material. Aeration such as produced in the homogenizing step 113 and also by agitation in step 121, provides some air entrapment between the striations of egg yolk material. During cooking, such air, by expansion, serves to increase the volume of the cooked material, which tends to impart some porosity. In step 122, the composite material from step 121 is pourable and is deposited in measured amounts to produce Product O, which is suitable for direct cooking. Also, the measured masses from step 122 are shown being subjected to freezing 123, and packaging 124, to produce the marketable Product P. When it is desired to use such a product, it is subjected to defrosting and cooking 125 to produce the cooked Product Q. Instead of the yolk being made harder than the whites, the whites may be harder than the yolk to provide a hardness and mouth feel differential.

The Products O, P, and Q have characteristics that are comparable to the customary omelet or scrambled eggs forms. The distribution of the yolk pieces takes place while the egg white is in the form of a cream-like dispersion. The striated character of the mass is evident after cooking, because the thickened egg yolk material tends to maintain the form and distribution of the slices or cut fragments, instead of homogeneously blending with the white material.

In the foregoing, reference has been made in connection with steps 111 and 116 to heat treatment to obtain the desired degree of congealing or coagulation. Also, reference has been made to carrying out pasteurization when the source materials are fresh egg white and fresh egg yolk, and when the refrigerated or frozen materials have not been pasteurized. Pasteurization can be carried out as a separate step preceding heating to effect the desired degree of coagulation. However, with certain types of equipment, as for example continuous flow heat exchange equipment, pasteurization and controlled coagulation can be carried out in one operation with proper control of temperature and time periods.

In carrying out step 121, good results have been obtained by using equipment manufactured and sold by Moulinex Products, Inc. of Virginia Beach, Va., under the trade name of La Machine, with the equipment being provided with rotary cutting blades. With the rotary cutting blade assembly of such a machine being driven at a relatively high speed, the thickened yolk material is blended with the whites with a slicing action within a relatively short treatment period of the order of 1 to 2 seconds, the yolk pieces and the whites retaining their respective identities.

Examples of my invention are as follows:

EXAMPLE 1

The source material employed was commercial frozen pasteurized egg white. A quantity of the frozen material was thawed and warmed to about 120° F. One pound of this material was introduced into a Pyrex beaker having a diameter of 8 inches, providing a depth of about ½ inch. This was then introduced into a domestic type microwave oven for a short period of time sufficient to noticeably coagulate a perimeter margin of the material. It was noted that the perimeter coagulated portion was at a temperature of about 180° F., and that at about one inch toward the center of the beaker from the perimeter, the temperature of the material was about 160° F. At the center of the beaker the temperature remained at about 120° F. The coagulated portion was then removed from the beaker together with some uncoagulated liquid. The total amount thus removed was about 8 ounces, of which about 6 ounces was in a firm state of coagulation. Eight ounces of additional egg white material was then introduced into the beaker to take the place of that which had been removed, and the coagulating process just described was repeated, with removal of an additional 8 ounces of partially coagulated material, which was added to the first removed material. The removed material was then homogenized, making use of a Waring Blender which provided high energy agitation with high shear forces. The resulting homogeneous dispersion was a pourable semi-liquid of cream-like consistency. It did not possess the coherency of the coagulated egg white material before processing. The dispersion was frozen and subsequently thawed and cooked by various methods, including direct contact with saturated steam at atmospheric pressure, contact of a plastic film bag containing the processed egg material with such steam, and use of a domestic type microwave oven. These methods produced a final cooked product having good eating properties comparable to natural eggs cooked in the same fashion. It was evident that coagulation preceding forming the cream-like homogeneous dispersion did not detrimentally effect the quality of the cooked product. More specifically, the material was soft and tender after cooking, and was palatable with a good mouth feel. It was noted that the thawed material had cohesiveness and texture comparable to natural egg white material. Thus although such texture did not exist in the homogenized egg white dispersion, it was restored in the thawed and cooked product. During cooking the cohesiveness was such that the mass could be handled and inverted without falling apart.

In connection with the foregoing example, some additional samples were prepared in the same manner with a variation in the amount of uncoagulated egg white homogenized together with coagulated material. As a result of such further tests, it was observed that optimum results were obtained when the homogeneous dispersion consisted of about 80 to 90% coagulated material and about 10 to 20% uncoagulated albumen.

The above example was also carried out making use of pasteurized fresh egg white in place of commercial frozen egg white.

EXAMPLE 2

Eggs were cooked in boiling water for about 6 minutes, after which the shell and yolk were removed from the egg white. The separated coagulated "hard boiled" egg white was cooled to about 60° F. and then homogenized together with thawed commercial pasteurized egg whites. The ratio was about two-thirds coagulated egg whites and one-third liquid egg white. Homogenization was carried out as in Example 1 and served to produce a cream-like dispersion which was semi-liquid and flowable. Measured amounts of this dispersion were frozen and thereafter thawed and cooked as in Example 1.

EXAMPLE 3

A cream-like dispersion was produced in the same manner as in Example 1. The ratio of egg white materials that were homogenized was three-fourths coagulated material and one-fourth uncoagulated albumen. The homogeneous dispersion had a consistency similar to soft ice cream. A quantity of frozen commercial pasteurized egg yolk material was thawed and blended with 20% of water. This produced a relatively flowable liquid which was then chilled to about 30° F., which was the temperature of the egg white dispersion. At this temperature it was noted that the two materials were similar in viscosity. The two materials were then intermixed by stirring, thus producing a marbled striated effect comparable to scrambled eggs. Measured quantities of this combined material were then deposited in trays lined with plastic film, with four ounces in each tray. The consistency of this combined material was similar to soft ice cream. The deposited masses were then frozen, and thereafter they were thawed and cooked in the following manners:

a. The frozen product within a plastic film was introduced into a steam cabinet where it was contacted with steam at atmospheric pressure. This served to thaw and heat the products to a temperature of about 160° F. in about 5 minutes. Retention in the cabinet for about 20 minutes served to complete coagulation and cooking. The resulting product had the characteristics of a natural egg omelet.

b. The frozen products were placed beneath an infrared heating lamp which served to defrost the products in about 2 minutes and to produce a temperature of about 120° F. in the next 2 minutes. After further retention for about 20 minutes at the same temperature, the products were irradiated in a domestic microwave oven for about 15 seconds, which served to complete cooking.

c. The frozen products, enveloped in the plastic film in which they are frozen, were placed in a warming cabinet and exposed to an air temperature of about 140° F. This served, after a period of about 30 minutes to gradually defrost and to condition the products for eating. It was determined that the products could remain in the cabinet for a period of the order of 4 hours without deterioration. They could be eaten at that time, but eating properties were improved by irradiation in a domestic microwave oven for about 10 to 20 seconds.

d. Some of the frozen products were first defrosted and then deposited on a frying grill. Elevation of the product to an internal temperature of about 180° to 200° F. served to substantially complete coagulation. It was observed that the products could be handled without falling apart and could be turned over as is commonly done when cooking on a frying grill.

e. Frozen products were thawed and then placed in an oven having an overhead electrical heating element. During the cooking cycle the products were inverted or turned over but had sufficient strength because of the cohesive nature of the material to prevent falling apart. According to my observations the cohesiveness is developed by freezing and retention during storage, which appears to convert the white material from a creamy form to viscous gel state, characteristics of a tender fresh cooked egg white.

f. Frozen products were introduced into boiling water. This quickly thawed the products, and the extent of subsequent cooking depended upon the time period within the water. The product had sufficient cohesiveness after thawing to prevent break up during cooking. It was also verified that instead of cooking in hot water, thawing and cooking be carried out out by introducing the products into hot fat. (e.g., at 212° F.).

g. Some of the frozen products were placed between halves of buns and introduced into a domestic microwave oven to effect thawing and cooking. Thawing was carried out in about ½ minute and subsequent cooking in about ¾ minutes.

h. Frozen products were defrosted by placing them in a refrigerator for about 12 hours, after which they were sliced and mixed with pieces of cheese and chicken. It was determined that this was palatable when eaten cold, either by itself or when incorporated in a sandwhich. Also some of the thawed material was diced and used as a refrigerated egg component in salads.

Products made as in the above Example 3 were modified by the addition of pieces of food material deposited on or introduced in the product immediately before freezing. The additional materials included grated cheese, meat slices and flavoring. Such added materials became attached to the product during subsequent freezing and enhanced the eating properties and the dietetic value of the end cooked product.

EXAMPLE 4

The frozen egg white products produced as in Example 1 were subdivided by fracturing and grinding, resulting in a particulate material having particles of random size capable of passing through a 3 mesh screen (U.S. standard). When retained in frozen condition, the divided material was flowable and could be stored in frozen condition in plastic film bags or pouches. Measured amounts of the particulate material were placed in trays and subjected to cooking in a domestic microwave oven. It was found that during cooking the particles agglomerated together with random distribution to produce a final cooked product of the scrambled egg type.

EXAMPLE 5

Frozen egg white products were prepared as in Example 1. Separately egg yolk was prepared by diluting commercial pasteurized egg yolk with water in the manner described in Example 3, and then introducing a measured amount of this flowable material onto a mass of the particulate egg white. Some mixing served to distribute the liquid egg yolk throughout the mass, with the egg yolk coating the frozen particles. Masses of this mixture were frozen and subsequently subjected to cooking. The resulting product was comparable to an egg omelet made from natural eggs, the omelet having a yellow or golden color well distributed throughout the mass.

EXAMPLE 6

The procedure was similar to that described in the above Example 5. However, instead of introducing the egg yolk material in liquid form and mixing it with the frozen particulates of egg white, the egg yolk was frozen and subdivided by grinding in the same manner as the frozen whites. Measured amounts of the divided egg white and the divided egg yolk materials were then mixed and the mass introduced into plastic film bags or pouches and stored in a freezer. It was verified that such mixtures could likewise be cooked and that in the cooking process the white and the yolk merged to produce a final edible product of the omelet or scrambled egg type, depending upon the degree of distribution of the yolk within the white material. The cooked product was characterized by a striated dispersion of the low temperature induced, coagulated egg white with the egg yolk.

EXAMPLE 7

The procedure was substantially the same as in Example 3 up to the point of producing the egg white homogeneous dispersion. With both materials at a temperature of about 50° F., a layer of egg yolk material was first deposited on the bottom of the molding tray, and thereafter the homogeneous egg white material was deposited on top of the egg yolk to form an upper layer. By reference to volume, the proportions were about 3 parts egg white dispersion to one part of egg yolk. Such assemblies were then frozen. Thereafter the product was subdivided into particles of a size passing through a No. 3 mesh screen, and measured amounts were placed in plastic bags and stored in frozen condition. It was found that such products could be subsequently thawed and cooked to produce products having substantially the same eating properties as the products previously described. Aside from making use of such products to form edible products to be eaten like a cooked egg, it was found that the particles could be defrosted before or after being introduced into other food materials such as salads, and that when thawed, preferably in a refrigerator, they were soft and edible.

EXAMPLE 8

Commercially available standard pasteurized frozen egg yolk material was thawed, and it was observed that the material was relatively viscous and pasty, and in general quite different from the fluidity of natural egg yolks. When cooked in an oven of the microwave type the mass puffed to a greater size and spread laterally. Occasionally, it was subject to explosive effects, and in general, it no longer had a form comparable to that of the original mass. The same frozen egg yolk material, after thawing, was blended with water to which 1% of salt (NaCl) and 0.1% of lecithin had been added, whereby the total mix contained 25% of added water. This produced a slurry that was relatively thin or fluid at ambient temperature. Upon reducing the temperature of this material to about 45° to 50° F. with some agitation, it became noticeably more viscous. Upon reducing the temperature to about 28° to 30° F., the agitated material became a relatively thick semi-frozen slurry. When ½ ounce (14 grams), corresponding to the weight of a natural egg yolk, was deposited upon a flat surface it tended to retain a form similar to that of a natural egg yolk. Such deposited forms were placed in a freezer and frozen to about 0° F. These forms were then processed in a microwave oven using a defrosting cycle of about ½ minute. The defrosted forms were comparable to fresh egg yolks or fresh egg yolks that had been moderately heated. After thawing such forms were subjected to microwave cooking cycles varying in time from 10 to 30 seconds. It was observed that the state of the yolks varied from warm fluidity to moderately congealed condition, and that there were no noticeable explosive effects. In general, it was found that the state of the yolk material when subjected to a given amount of microwave input, for a given time cycle, was somewhat dependent upon the amount of water added during processing.

EXAMPLE 9

Frozen egg yolk bodies prepared as in Example 8 were provided with an edible coating by dipping them in a 1% aqueous solution of alginate (Keltone). After draining the forms were dipped in a 1% solution of calcium chloride. The resulting reaction served to set the alginate gel almost immediately, thus providing a relatively thin transparent membrane about each of the forms. It was noted that when such a coated form was thawed the membrane became pliable and extensible and served to confine the egg yolk material to a form comparable to the original configuration. It was found that the coated and frozen forms could be stored as a free-flowing bulk mass and that minor adherence of the forms due to surface ice crystals accumulated during storage did not prevent them from being readily separated by hand or agitation. When such masses were thawed and cooked in a microwave oven, the membrane was edible and comparable to the natural membrane surrounding fresh egg yolk material. Also it functioned in substantially the same manner as a natural membrane to retain the yolk in frozen storage and during thawing and cooking. With respect to the amount of dilution added to the egg yolk material, it was found that the best results were obtained by diluting the material with from 20 to 60% water, and preferably water containing 2% salt and 0.2% lecithin.

EXAMPLE 10

An egg white dispersion was formed as in Example 1. While at a temperature of about 28° F., measured amounts corresponding to a natural egg were deposited in molding trays. Frozen egg yolk bodies were prepared as in Example 9, and one such body was deposited on each quantity of egg white dispersion to produce assemblies as in FIG. 4. Such assemblies were then frozen to produce frozen products as in FIG. 6. Such products were thawed and cooked in a microwave oven, both by themselves and in assemblies as shown in FIG. 9.

EXAMPLE 11

The source material was 12 pounds of commercial pasteurized egg whites in frozen condition. After thawing, two pound batches of the thawed material were introduced into a container which had a teflon coating on its inner surface. The container was heated to a temperature above the coagulating point of the egg material, but not to a sufficiently high temperature to cause discoloration or scorching of the material. When the main body of material reached a temperature of about 120° F., coagulation commenced along the heated surfaces of the container walls, which were at a substantially higher temperature (e.g., 180° F. to 212° F.). Continuous agitation was applied to the mass, with a scraping away action along the heated surfaces of the container walls, to remove the layers of coagulated material being formed by direct contact with the walls of the container. The temperature of the main body gradually increased to about 140° F. to 142° F., at which time it was estimated by observation that coagulation was to the extent of about 75%. The mass was then cooled to about 40° F. and introduced into a Waring Blender. Treatment in the Waring Blender served to homogenize the material and to produce an aerated, creamy, homogeneous mass. Treatment in the Waring Blender served to elevate the temperature of the mass from an ingoing temperature of about 40° F. to about 60° F. The mass was then cooled to about 28° F. to 40° F., which increased its viscosity or thickness but with the material retaining some fluidity.

The source of egg yolk material was conventional frozen pasteurized egg yolks. After thawing, batches of the egg yolk material were heat treated in the same manner as described above for the egg white material. During this treatment some coagulation and thickening of the egg yolk material occurred, and at the end of this operation, the material had a temperature of about 140° F. After cooling to about 60° F., the yolk material was a thick pasty mass. Measured amounts of the egg white and egg yolk materials were introduced into high speed slicing equipment, namely the Moulinex equipment as previously described, equiped with a rotary slicing knife. After treatment for only a few seconds, the composite mass was removed and inspected. It was found that some of the yolk material had blended with the white material, but that a substantial part of the yolk material appeared as slices or cut pieces, which were distributed in the white material in a striated manner. The slicing effect upon the egg yolk material and distribution of the slices in the form of striations in the egg white material were attributed to the fact that as introduced into the high speed slicing equipment, the yolk material was substantially thicker and maintained its physical identity in contrast with the more fluid egg white material. In subsequent tests, it was verified that the difference in physical characteristics between the egg white material and the egg yolk material could be varied by controlling the difference between their temperatures. For example, by decreasing the temperature of the egg yolk material introduced into the equipment, so that it was at a temperature substantially lower than the temperature of the egg white material, the striating effect was accentuated, with less of the yolk material being dispersed into the egg white material. Thus by providing a substantial temperature difference between the white and yolk portion and by varying the relative temperatures and differences, it was found that the character of the product could be altered accordingly. Dispersion of some of the egg yolk material into the egg white served to impart a yellow color to the entire mass. Measured amounts of the composite material were introduced into molding trays and then frozen. The frozen unit, which corresponded to a normal egg in quantity, is represented by Product K of FIG. 14. Some of the composite material was introduced into larger containers and frozen. After thawing, measured amounts (about 60 grams) were dipped out with an ice cream scoop and deposited on a fiberboard plate. They were then cooked in a standard domestic-type microwave oven. The cooked egg was tender and had palatability and flavor comparable to a cooked fresh egg. It was verified that measured amounts of such composite material could be placed upon a half of a bun and cooked in a microwave oven as previously described. Likewise, it was verified that the material could be cooked in manners similar to natural eggs to form, for example, omelets fortified with melted cheese and other foods components, such as ham, cheese, pimento, etc. It was noted that during cooking, the egg material expanded in a manner comparable to what occurs in the cooking of fresh eggs. After discontinuing application of heat, the eggs collapsed, like natural eggs, leaving the collapsed or settled egg with a porosity which made for palatability.

EXAMPLE 12

A homogeneous egg white dispersion was prepared according to the procedure of Example 1. However, pasteurized fresh egg white was used, instead of commercial or frozen egg white. At a temperature of about 28° F. the dispersion was a semifrozen slush. Samples, each weighing about 30 grams, were deposited on a metal plate chilled to about 28° F., using a conventional plunger-type valve depositor. The deposited units spread slowly to a diameter of about 3 inches, and ¼ inch thick. Further spreading was restricted by the viscosity and the temperature of the pan. Frozen egg yolk bodies were prepared according to the procedure of Example 8 or 9. These bodies, while at a temperature of about 0° F., were deposited upon the masses of semi-frozen egg white. Each egg yolk body weighed about 14 grams, and was in the form of a wafer about 1¼ inches in diameter. These assemblies were then frozen and separately packaged. Such assemblies, when thawed in a refrigerator and cooked as in a microwave oven, simulate natural cooked eggs in appearance, the quality being equal to natural cooked eggs, having reference to flavor, tenderness and palatability.

It has been pointed out that cooking of fresh eggs or commercial frozen egg white material, as practiced in the past, produces a product which, when frozen and cooked, has seriously impaired quality compared to a cooked fresh natural egg. Presumably, cooking results in certain irreversible changes in the egg white which, when frozen, cause serious deterioration. In contrast with prior practice, in the present invention, precoagulation plus homoginization of coagulated and uncoagulated egg white makes possible freezing without impairing the quality of the final cooked egg. In addition the formation of a gel structure during the course of freezing and subsequent thawing imparts desirable properties particularly in that the product, after thawing, is not subject to serious exudation of liquid and is in the form of a gel.

EXAMPLE 13

A creamy egg white dispersion was prepared as in Example 1. It was then refrigerated to a temperature of the order of 35° F. to 45° F. for a storage period to simulate the condition of the dispersion in a commercial operation, where the product may be held under refrigeration during storage and transit. The material was then deposited in disc-shaped forms comparable in amount to a fresh egg, the forms being deposited directly upon one half of a bun, with the understanding that other edible materials (e.g. slices of meat, cheese, etc.) could be added upon or between the form and the bun. A refrigerated body of pasteurized egg yolk was then deposited directly upon the egg white. Here again, it was understood that other food material might be added on top of the egg white/yolk assembly. After applying the top half of the bun and placing it in a bag or pouch, the package was placed in a refrigerator to freeze the egg assembly and other ingredients of the package. When distributed to a retail establishment, the packages would be stored in a refrigerator for consumer sale and for thawing.

The consumer would prepare the product for eating by short time heating in a microwave oven, or the thawed assembly may be eaten cold.

Certain tests have been made to confirm the physical nature of the egg whites at different stages of the process. For purposes of the test, an egg white dispersion was prepared as in Example 1. This was chilled to about 40° F. and some uncoagulated white permitted to drain away. The remaining material was estimated to consist of about 20% uncoagulated and 80% coagulated. This was converted to a cream-like dispersion in a high speed Waring Blender. When chilled to about 30° F., it was sufficiently thickened to be deposited without undue spreading. It had little, if any, characteristics of a gel, although it appeared to have the properties of a colloid.

A first sample consisting of forty grams of the above dispersion was stored at 70° F. in a plastic film bag for a period of three days. At the end of that time no physical change in the physical nature of the product could be observed other than a slight thickening. Particularly, the product remained substantially free of gellation. Thus, when a portion of a deposited mass was raised with a spatula, it instantly caused the mass to separate, thus demonstrating tenderness and lack of cohesiveness or exudation of clear separated liquid.

A second quantity of the same egg white dispersion was chilled to 28° F. and then warmed to 70° F. A slight amount of gellation was observed. Both the first and second samples after three days' storage remained stable and did not exhibit syneresis (i.e. minimal exudation of liquid).

A third sample of the dispersion was placed in a plastic film bag and stored in a refrigerator at 35° F. At the end of three days' storage it was noted that a minor amount of gellation had occurred. However, the sample remained tender like a soft pudding, and when subjected to the spatula test described above, it exhibited the same tenderness and lack of cohesiveness, and no or minimal exudation.

A fourth sample of the dispersion, prepared as described above, having about 15 to 20% of the material uncoagulated, was deposited on a supporting plate as round or disc forms about 2½ inches in diameter. These forms were then frozen in one hour to about 0° F. in a freezer. After storage for four days, such samples were removed and thawed to 70° F. in about forty minutes. The thawed forms were cohesive with substantial gellation. When subjected to the spatula test the disc remained intact although the width of the spatula was only about one half the width of the sample. At refrigeration temperature only a minor amount of liquid exudation was noted, but not to an extent sufficient to be objectionable or to detrimentally affect the product when eaten with or without heating or cooking. Substantially the same results were obtained immediately after the frozen forms were thawed to ambient temperature.

A test was also made to determine the results obtained by use of fast freezing. The egg white dispersion forms, prepared and deposited as described above, were rapidly frozen between layers of dry ice to a temperature estimated to be of the order well below 0° F. and probably of the order of $-20°$ F. to $-100°$ F. Thereafter, the frozen forms were thawed to ambient room temperature of 70° F. The thawed forms were observed to have excellent cohesion and gellation. When cooked as in a microwave oven, the thawed forms had the tender coagulate state of fresh cooked egg white. It was concluded from this test that fast freezing gave results somewhat superior to slower freezing in a refrigerator, although satisfactory results are obtained by both methods.

For purposes of comparison with the above tests and results, egg white was substantially completely coagulated by heating and then frozen in a freezer and by contact with dry ice as described above. In both instances, after thawing and after heating, the products were tough and rubbery, and in general were of poor quality compared to products obtained by the present process.

What is claimed is:

1. A process for producing an egg product from raw egg white separated from egg yolk comprising the steps of heating the egg white to effect preliminary coagulation thereof, subjecting a portion of the coagulated egg white to processing together with an uncoagulated egg white portion, the processing including applying high energy agitation to said coagulated and uncoagulated portions to form a homogeneous aerated dispersion, and then freezing the dispersion.

2. A process as in claim 1 in which the processing of the egg white portions includes subjecting the same to high energy agitation and high shear forces to destroy their natural texture and to form a homogeneous, aerated, flowable, cream-like dispersion, and wherein the egg white, when the frozen dispersion is thawed, has a gel structure.

3. A process as in claim 1 in which the preliminary coagulation of the egg white is carried out by heating under such conditions that there is a substantial portion of remaining uncoagulated egg white.

4. A process as in claim 1 in which the uncoagulated egg white portion is added to the coagulated egg white portion before forming the homogeneous dispersion.

5. A process as in claim 1 in which a predetermined amount of egg yolk is added to a predetermined amount of the egg white dispersion to form a composite assembly, after which the composite assembly is frozen.

6. A process as in claim 5 in which the egg yolk, when added, is in frozen condition.

7. A process as in claim 6 in which the frozen egg yolk is in the form of a body that is coated with an edible hydrophilic membrane.

8. A process as in claim 5 in which the added egg yolk is relatively harder than the egg white dispersion.

9. A process as in claim 8 in which the egg yolk is subjected to slicing before adding the same to the egg white dispersion.

10. The product produced by the process of claim 1.
11. The product produced by the process of claim 2.
12. The product produced by the process of claim 5.
13. The product produced by the process of claim 6.
14. The product produced by the process of claim 9.

15. A process for producing an egg product comprising separately processing egg white and yolk, the processing of the egg white including coagulating the egg white to form both coagulated and uncoagulated egg white portions, applying high energy agitation with high shear forces to said egg white portions to form a homogeneous, flowable, cream-like, aerated dispersion, assembling predetermined amounts of the dispersion and processed yolk and then freezing the assembly, wherein the egg white, when the frozen assembly is thawed, is no longer flowable and has a gel structure.

16. A process as in claim 5 in which the processed yolk is in the form of frozen bodies of predetermined weight when assembled with the egg white dispersion.

17. A process as in claim 16 in which the frozen yolk bodies are coated with a hydrophilic membrane before being assembled with the egg white dispersion.

18. A process as in claim 16 in which the egg yolk is processed by blending the same with about 20 to 60% water before being frozen.

19. A process as in claim 15 in which the processed yolk is assembled with the egg white dispersion as in an omelet or scrambled egg.

20. A process as in claim 15 in which the egg yolk is thickened before being assembled with the egg white dispersion.

21. A process as in claim 15 including processing the egg yolk by heating to effect some coagulation and thickening, cooling the processed egg yolk and then blending the cooled yolk with the egg white dispersion to form an assembly, the blending being carried out by a mixing action and a slicing of the egg yolk, whereby the resulting assembly contains striations of egg yolk having a hardness greater than that of the egg white.

22. A process as in claim 21 in which the processed egg yolk and egg white dispersion are aerated during said blending.

23. A process as in claim 15 in which the coagulation of the egg white is such that the coagulated portion is a cohesive semifluid textured material before forming the homogeneous dispersion, and the homogeneous dispersion is flowable and without natural texture before freezing.

24. A process as in claim 15 in which the coagulation of the egg white is made substantially complete, and the uncoagulated egg white portion is added to the coagulated egg white portion before forming the homogeneous dispersion.

25. A process as in claim 15 in which the processed egg white and yolk are assembled in measured amounts, and the egg white is chilled to form a thickened slurry before it is assembled with the processed egg yolk.

26. The product produced by the process of claim 15.

27. The product produced by the process of claim 17.

28. The product produced by the process of claim 20.

29. A process for producing an egg product comprising separately processing pasteurized egg white material and yolk material, the processing of the egg white material including forming heat coagulated egg white material and uncoagulated egg white material, combining the heat coagulated and uncoagulated egg white materials, subjecting the combined materials to high energy agitation with high shear forces to form an aerated and homogeneous cream-like flowable egg white dispersion, combining a predetermined amount of the dispersion with a predetermined amount of the separately processed yolk material to form an assembly, and then freezing the assembly.

30. A process as in claim 29 in which the egg yolk material is processed by blending the same with water.

31. A process as in claim 29 in which the egg yolk material is processed by heating the egg yolk material to effect some coagulation and thickening, cooling the heated egg yolk material, and then blending the cooled egg yolk material with the egg white dispersion, the blending being accompanied by slicing of the egg yolk material.

32. A process as in claim 29 in which the egg white, when the frozen assembly is thawed, is cohesive and in the form of a gel.

33. A process as in claim 29 in which the frozen assembly is subdivided to form a particulate material.

34. The product produced by the process of claim 29.

35. The product produced by the process of claim 31.

36. The product produced by the process of claim 32.

37. A process for producing an egg product comprising separately processing pasteurized egg white and yolk materials, the processing of the egg white material including forming heat coagulated egg white material and uncoagulated egg white material, combining the heat coagulated and uncoagulated egg white materials, subjecting the combined materials to high energy agitation with high shear forces to form an aerated and homogeneous cream-like flowable egg white dispersion, separately freezing the dispersion and the processed egg yolk material, subdividing the separately frozen dispersion and egg yolk material to form particulate frozen materials, and then combining the particulate frozen materials.

38. The product produced by the process of claim 37.

39. A composite egg product comprising a homogeneous aerated dispersion of coagulated and uncoagulated egg white and separate egg yolk material retained by the egg white dispersion, the product being in frozen condition and wherein the egg white, when the frozen product is thawed, has a gel structure without any substantial flowability.

40. A product as in claim 39 in which the yolk material is coated with an edible hydrophilic membrane.

41. A product as in claim 39 wherein, when the product is subjected to thawing and cooking, the egg white is not subject to excessive exudation of liquid material.

42. A product as in claim 39 in which the egg white is so conditioned that upon thawing and cooking the product, the cooked egg white is a soft and tender gel and is comparable in eating properties to a freshly cooked natural egg.

43. A product as in claim 39 in subdivided particulate form.

44. A process for producing an egg product comprising separately freezing partially coagulated, homogenized and aerated egg white material and egg yolk material, subdividing the frozen materials, and assembling the subdivided materials in a product in predetermined proportions while retaining the identities of the egg white and yolk.

45. A process for the manufacture of an edible food product of the sandwich type comprising the steps of forming an assembly of partially coagulated, homogenized and aerated egg white and egg yolk, introducing the assembly between dough layers to form a sandwich, freezing the sandwich, and thereafter thawing the sandwich preparatory to eating the same.

* * * * *